(No Model.)
J. E. FISHER.
THILL COUPLING.
No. 519,470. Patented May 8, 1894.
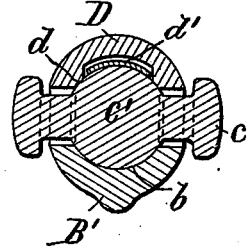
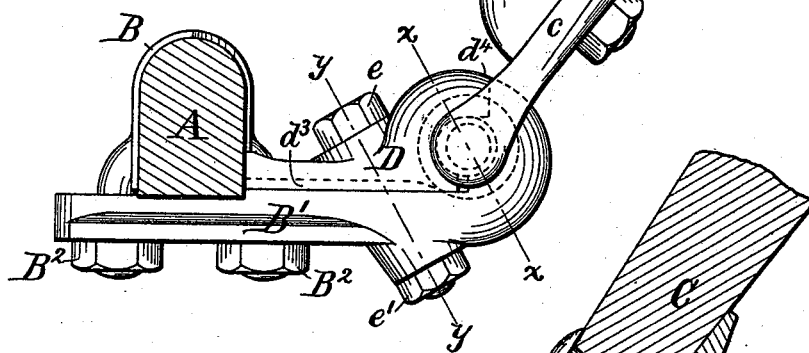
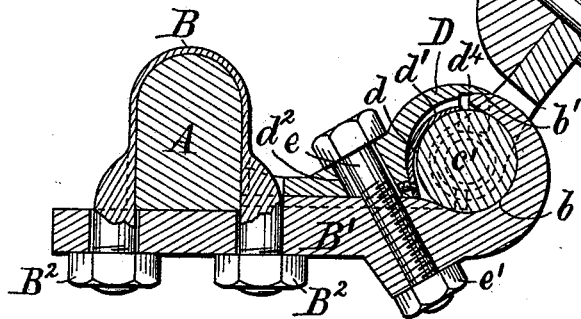
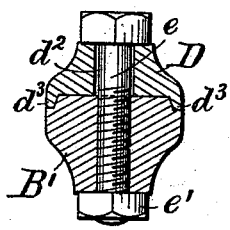
Witnesses
Minnie Phalon
Abbott S. Mitchell
Inventor
John E. Fisher
by
Henry Chadbourn,
his Atty.

UNITED STATES PATENT OFFICE.

JOHN E. FISHER, OF BOSTON, MASSACHUSETTS, ASSIGNOR OF ONE-HALF TO CIRTHBERT C. MUNROE, OF SAME PLACE, AND CHARLES F. HASTINGS, OF SOMERVILLE, MASSACHUSETTS.

THILL-COUPLING.

SPECIFICATION forming part of Letters Patent No. 519,470, dated May 8, 1894.

Application filed June 21, 1893. Serial No. 478,342. (No model.)

*To all whom it may concern:*

Be it known that I, JOHN E. FISHER, a citizen of the United States, residing at Boston, in the county of Suffolk and Commonwealth of Massachusetts, have invented certain new and useful Improvements in Thill-Couplings; and I do hereby declare the following to be a full, clear, and exact description of the invention, such as will enable others skilled in the art to which it appertains to make and use the same.

This invention relates to improvements in thill couplings, and particularly to improvements in the coupling for which Letters Patent of the United States, numbered 405,108 were issued to Cirthbert C. Munroe June 11, 1889, and of which patent I am now a part owner.

It has for its object to provide means to automatically take up any looseness in the joint caused by the wear of the ball or socket, and to form a tight joint between the cap and other part of the coupling so as to prevent dust and dirt from entering the joint of the coupling on which the thills turn.

The invention is carried out as follows, reference being had to the accompanying drawings forming an essential part of this specification, wherein—

Figure 1 represents a side elevation of my improved thill coupling. Fig. 2 represents a central longitudinal section of the same. Fig. 3 represents a cross section on the line $x$—$x$ in Fig. 1. Fig. 4 represents a cross section on the line $y$—$y$ in Fig. 1.

Similar letters refer to similar parts on the different parts of the drawings.

A represents the axle, B the clip and C the thill of a vehicle as usual. To the thill is bolted the forked thill-iron $c$, which is provided with the ball $c'$ as in the patent to Munroe mentioned above. The clip is firmly attached to the axle by means of the cross bar B' and nuts $B^2$ $B^2$. The cross bar is provided on its forward end with a socket $b$, which, in connection with the socket $d$ in the cap D, forms a complete socket for the ball $c'$ on the thill-iron, as in said Munroe patent.

In my improved coupling I provide the socket in the cap with the spring $d'$ which is attached to the cap and presses against the ball $c'$ when the coupling is in proper operative position. The pressure of the spring on the ball prevents any loose movement of the ball within the socket, and automatically takes up any slight wearing of the socket or ball which would otherwise allow the ball to rattle within the socket. To allow of taking up the wear, and consequent loose motion of the ball within the socket, when such wear is greater than can be automatically taken up by the spring, I provide the cap with the slotted perforation $d^2$ through which the bolt $e$ passes, which bolt is screwed through the forward end of the cross-bar B' and is provided on its outer end with the check-nut $e'$ substantially as shown. Thus it will be seen that in order to take up the rear it is only necessary to unscrew the check-nut and bolt and then slide the cap outward on the forward end of the cross-bar as far as possible, then to secure it in such position by setting the bolt and check-nut, which will cause the spring $d'$ to press firmly against the ball $c'$. The cap D is guided in its movements forward and backward on the cross-bar, by the downward projecting lips $d^3$ $d^3$ as shown in Fig. 4.

In the Munroe patent above mentioned, the only means for taking up the wear of the ball within the socket, is by the adjustment of the cap upon the forward end of the cross-bar of the clip by means of the diagonal screw, no automatic take-up being used. This would require the frequent adjusting of the cap if it were desired to prevent all rattling of the ball within the socket. I overcome this objection by the use of the spring $d'$ as described.

To exclude dust or dirt from the joint between the ball $c'$ and socket $b$ $d$, I provide the cap with the forward projecting lip $d^4$, which exactly fits and slides upon the surface $b'$ on the forward end of the cross-bar B even during the adjustment of the cap on the cross-bar. By this means a perfectly tight joint is maintained between the cap and forward end of the cross-bar at all times, which excludes the dust and dirt from the ball and socket joint and causes it to wear much longer.

In the Munroe patent mentioned above, the corresponding joint between the cap and forward end of the cross-bar was perfectly tight only when the cap had been adjusted to its extreme outer position on the cross-bar, the joint being more or less open during the other positions of the cap, and as the joint was open the most of the time, dust and dirt were admitted and the joint worn loose by the action of such dust or dirt.

Having thus fully described the nature, construction, and operation of my invention, I wish to secure by Letters Patent and claim—

1. In a thill coupling, the ball attached to the thill, the cross bar attached to the axle of the vehicle having the socket to receive the ball and the cap for the socket adjustable upon the cross bar toward or from the axle to properly adjust it upon the ball to prevent rattle, combined with the elliptic spring $d'$ within the cap, having one end attached to the cap and the other end resting upon the ball to compensate for any slight looseness of the ball within the socket, substantially as set forth.

2. In a thill coupling, the ball attached to the thill, the cross bar attached to the axle of the vehicle having the socket to receive the ball, combined with the cap for the socket adjustable on the cross bar toward or from the axle, to properly adjust the cap on the ball, and the lip $d^4$ to cover the joint between the cap and cross bar at all adjustments of the cap to exclude dust or dirt from the ball and socket, substantially as set forth.

In witness whereof I hereunto set my hand in presence of two subscribing witnesses.

JOHN E. FISHER.

Witnesses:
HENRY CHADBOURN,
MINNIE PHALON.